United States Patent [19]
Johnston

[11] Patent Number: 5,348,312
[45] Date of Patent: Sep. 20, 1994

[54] CASSETTE SEAL

[75] Inventor: David E. Johnston, Weinheim, Fed. Rep. of Germany

[73] Assignee: Firma Carl Freudenberg, Weinheim, Fed. Rep. of Germany

[21] Appl. No.: 900,989

[22] Filed: Jun. 18, 1992

[30] Foreign Application Priority Data

Jul. 30, 1991 [DE] Fed. Rep. of Germany ....... 4125183

[51] Int. Cl.$^5$ .............................................. F16J 15/32
[52] U.S. Cl. ........................................ 277/39; 277/95
[58] Field of Search ...................... 277/9.5, 11, 38, 39, 277/40, 41, 95, DIG. 10, 152, 65, 96.1; 384/482

[56] References Cited

U.S. PATENT DOCUMENTS

| | | | |
|---|---|---|---|
| 3,021,161 | 2/1962 | Rhoads et al. | 277/39 |
| 3,086,781 | 4/1963 | Hudson et al. | 277/39 |
| 3,156,474 | 11/1964 | Nelson | 277/39 |
| 3,275,333 | 9/1966 | Scott et al. | 277/39 |
| 3,561,770 | 2/1971 | Corsi et al. | 277/39 |
| 4,643,436 | 2/1987 | Jackowski | 277/DIG. 10 X |
| 4,886,281 | 12/1989 | Ehrmann et al. | 277/152 X |
| 4,962,936 | 10/1990 | Matsushima | 277/39 X |
| 4,969,653 | 11/1990 | Breen | 277/227 X |
| 5,024,450 | 6/1991 | Hawley et al. | 277/39 X |
| 5,085,444 | 2/1992 | Murakami et al. | 277/152 X |

FOREIGN PATENT DOCUMENTS 0881607 11/1961 United Kingdom .

Primary Examiner—William A. Cuchlinski, Jr.
Assistant Examiner—John L. Beres
Attorney, Agent, or Firm—Kenyon & Kenyon

[57] ABSTRACT

A cassette seal for sealing off the gap between a bore hole and a shaft. The seal includes an inner ring which is secured to the shaft and has a groove open radially to the outside. The seal also includes an outer ring secured in the bore hole with a radial projection of a flange-type design that engages with the groove. The groove is defined in the axial direction by end faces turned toward each other. A sealing lip secured in the area of the inner circumference to the radial projection is formed from a polymer material. At least the inner ring is formed from a plastically deformed sheet metal. The sealing lip sealingly contacts the inner ring in the area of one end face. The inner ring is designed in one piece and is provided in the area of both axial ends with ring projections, which are produced by a plastic deformation and project radially to the outside. The outer ring is limited bounded in the axial direction on both sides by range spacers formed from a polymer material. The range spacers are set apart in the circumferential direction and abut on the end faces when the cassette seal is new and unused.

12 Claims, 4 Drawing Sheets

CASSETTE SEAL

BACKGROUND OF THE INVENTION

The present invention relates to a cassette seal for sealing off the gap between a bore hole and a shaft.

A known cassette seal is shown in U.K. Patent No. 881,607 having inner and outer rings of a comparatively complicated shape, which are secured inside one another. Limit-stop devices are provided in the inner and outer rings to simplify assembly. These limit stop devices are formed from rubber elastic material and are removed over time during normal use because of the relative movement between the inner and outer rings. The working properties of this known cassette seal are not satisfactory, the medium to be sealed off is not sufficiently recirculated in the direction of the space to be sealed off.

An object of the present invention is to provide a cassette seal that attains a considerably simplified and economic construction and assembly so that the seal comprises fewer individual parts to be secured inside one another. Another object of the present invention is to provide an improved cassette seal where the medium to be sealed off is better recirculated back into the space to be sealed off.

SUMMARY OF THE INVENTION

These and other objectives are met by the cassette seal of the present invention. The cassette seal comprises an inner ring, which is secured to the shaft and has a groove open radially to the outside and an outer ring secured in a bore hole with a radial projection of a flange-type design that engages with the groove. The groove is defined in the axial direction by end faces turned toward each other. A sealing lip is secured in the area of the inner circumference to the radial projection and comprises a polymer material. At least the inner ring is formed of a plastically deformed sheet metal.

In the cassette seal of the invention, the sealing lip sealingly contacts the inner ring in the area of one end face. The inner ring is designed as one piece and is provided in the area of both axial ends with ring projections, which are produced by a plastic deformation and project radially to the outside. The outer ring is limited in the axial direction on both sides by range spacers formed of polymer material, which are set apart in the circumferential direction and abut on the end faces when the cassette seal is new. Advantageously, the sealing lip is arranged directly in the vicinity of the fluid inflow in the cassette seal. Because of the form of the sealing lip, which is configured on the radially running end face of the ring projection, a particularly good sealing action is attained, as well as a good recirculating effect in the direction of the space to be sealed off. The one-piece design of the inner ring with the ring projections arranged parallel to one another enables a comparatively simple assembly of the cassette seal. The construction requires few parts making an economical manufacturing possible. The range spacers retain the outer ring in a defined axial position within the inner ring thereby simplifying the assembly.

After the assembly is completed, the nubs touching on the end faces are sheared off during normal use, so that there is a direct contact between the inner ring and the outer ring only in the area of the sealing lip.

In an improvement of the present invention, the outer ring is completely surrounded by polymer material and the range spacers, the sealing lip, and the housing seal are also formed of a polymer material so that they blend into one another into one piece. This improvement simplifies the manufacturing of the outer ring as well as its installation into the inner ring. The one-piece design of the outer ring ensures that the seal can be manufactured economically.

The range spacers can be made of positioning nubs, which exhibit at least the same extent in the axial direction. Given the relative movement between the inner ring and the outer ring in the circumferential direction, the positioning nubs are shorn off very easily, and the seal readily acquires excellent working properties shortly after normal use begins.

The positioning nubs taken, one axial side at a time, can be allocated to an imaginary axis of rotation of the shaft at the same radial distance. The positioning nubs on the side facing the space to be sealed off exhibit a greater radial distance from the axis of rotation than the positioning nubs on the side turned away from the space to be sealed off. The radial offset of the positioning nubs guarantees an especially cant-free installation of the cassette seal in the bore hole. The positioning nubs exhibit a radial clearance from one another that is as large as possible considering the realities of construction. This substantially reduces the possibility for damage, especially to the housing seal. Moreover, the cassette seal can be inserted into the bore hole so that it engages with the inner ring, and also, if required by special conditions, so that it engages with any other point on the radial front end.

To seal off the shaft from the inner ring, a seal is configured in the radial direction between these parts and is secured in a fluid-tight manner to the inner ring. This seal exhibits at least two mutually adjacent sealing areas in the axial direction which abut sealingly on the shaft during normal use of the cassette seal. Moreover, the sealing areas can exhibit a curvilinier profile. This seal is a static seal, since there is no relative movement in the circumferential direction between the inner ring and the shaft. A reliable sealing action is guaranteed at all times resulting from a flexible preloading of the curvilinier sealing areas and the resulting flattening of these areas at the points of contact with the shaft.

The sealing lip exhibits a particularly advantageous sealing of the space to be sealed off and is especially effective in delivering the medium to be sealed off back into the space to be sealed off when, in the unmounted state, it is widened in the radial direction to the outside and forms an angle of 10° to 60° (preferably 20° to 45°) with the axis of rotation.

The working properties are further improved when the sealing lip exhibits at least two sealing edges which are adjacent in the direction of the space to be sealed off. The sealing edges are formed by converging boundary surfaces of sealing teeth that adjoin one another. Moreover, the boundary surfaces, which are arranged one behind the other in the direction of the space to be sealed off, form a larger angle with the end face than the boundary surfaces converging with it. In case of possible radial movements of the shaft, a discharge effect in the direction of the space to be sealed off nevertheless continues to be guaranteed and the medium to be sealed off does not get past the sealing teeth into the space to be protected.

According to another improvement of the present invention, the sealing lip can be limited in the direction of the space to be sealed off by an end section which lies flat on the end face. The comparatively more highly stressed end section and its flat contacting with the end face result in a considerably extended service life for the cassette seal with improved working properties. With this improvement, the surface compression in the area of the sealing lip along the end face is of roughly the same magnitude.

The sealing effect is further improved when the sealing lip, in at least one subsection of its extent, surrounds a reinforcement element that is flexible only in the axial direction. This measure effectively prevents relaxation in the sealing lip, even at higher ambient temperatures. Furthermore, a flexible reinforcement which shows only compliance in the axial direction has the advantage that, in case of positional changes of the housing and/or of the shaft (for example due to temperature-dependent expansions) the good sealing effect is retained.

In addition, an annular helical spring can be configured in the cassette seal in the vicinity of the sealing lip, which is formed from flexible material, to minimize any relaxation.

DETAILED DESCRIPTION

Figure 1:
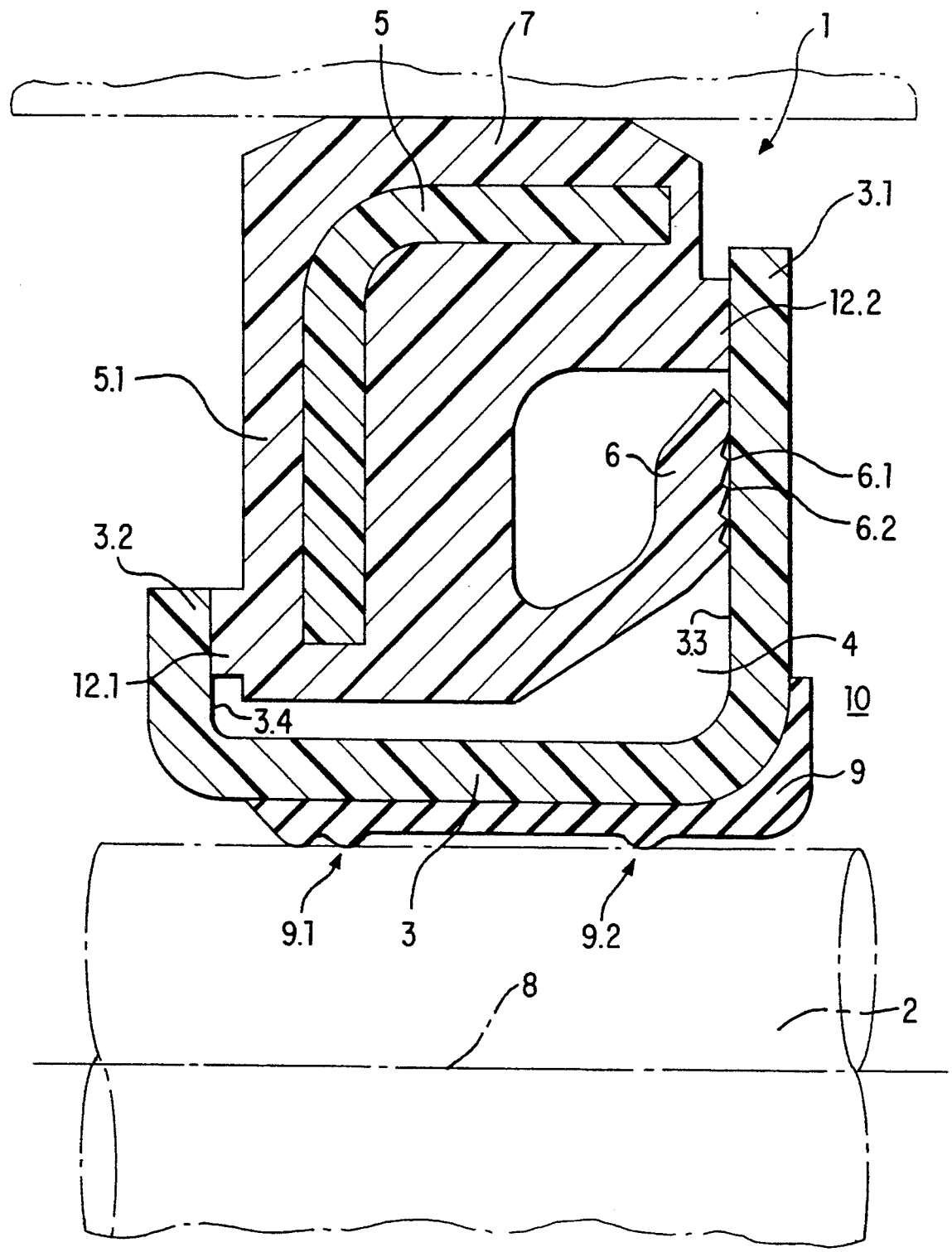
FIG. 1 shows a cassette seal according to the present invention, which is arranged in the radial direction in a bore hole between a shaft and a housing.

Referring to FIG. 1, the cassette seal of the present invention is shown arranged in a bore hole 1 sealing off the gap between a shaft 2 and a housing. The shaft 2 is depicted only schematically here with dot-dash lines. An inner ring 3 is secured to the shaft 2, a seal 9 is configured in the radial direction between the shaft 2 and the inner ring 3. The seal 9 is secured in a fluid-tight manner to the inner ring 3. The seal 9 exhibits at least two sealing areas 9.1, 9.2, which adjoin one another in the axial direction. The sealing areas 9.1, 9.2 are curvilinier in shape and, during normal use of the cassette seal, abut with preloading on the shaft 2. The preloading produces a flexible flattening of the curvilinear areas on the shaft and thus a reliable, static sealing action at these locations.

The inner ring 3 has a one-piece design and is provided in the area of both axial ends with ring projections 3.1, 3.2, which project radially to the outside and are produced by a plastic deformation. The ring projections 3.1, 3.2, which project radially to the outside, form a groove 4, which is open radially to the outside and contains the outer ring 5. The outer ring 5 is contained in the bore hole 1 and touches on the inner housing wall so that it sealingly abuts against it and is relatively locked to prevent turning. The sealing surface of the outer ring 5 can be shaped in different ways and exhibits, for example, several axially adjacent sealing lips running along its circumference. The groove 4 is limited in the axial direction by end faces 3.3, 3.4, which face one another and are components of the ring projections 3.1, 3.2. A sealing lip 6 formed from a polymer material is affixed to the radial projection 5.1 of the outer ring 5. The sealing lip 6 sealingly touches on the inner ring 3 in the vicinity of the end face 3.3 that faces the space 10 to be sealed off.

The sealing lip 6 has several sealing edges 6.1, 6.2, 6.3, 6.4, which adjoin one another in the direction of the space 10 to be sealed off. The sealing edges 6.1, 6.2, 6.3, 6.4 are formed by converging boundary surfaces 6.1.1, 6.1.2 (See FIG. 2) of sealing teeth that are adjacent to one another. The boundary surfaces 6.1.1 arranged one after another in the direction of the space 10 to be sealed off form a larger angle with the end face 3.3, than the angle between the boundary surfaces 6.1.2 and the end face 3.3. In case of possibly occurring radial deflections of the shaft 2, a discharge effect results in the direction of the space 10 to be sealed off. This discharge effect is guaranteed, without the danger of the medium to be sealed off attaining the space to be protected. With a nearly uniform surface compression and a reduced amount of wear that the sealing lip 6 is subject this sealing lip exhibits an end section that lies flat on the end face in the direction of the space 10 to be sealed off.

In this example, the inner ring 3 is formed from a plastically deformed sheet metal. The outer ring 5 is completely surrounded by polymer material and, in the axial direction on both sides, has range spacers 12.1, 12.2, . . . formed from a polymer material. The range spacers 12.1, 12.2, . . . are set apart in the circumferential direction and are formed in one piece with the housing seal 7 and the sealing lip 6, and abut on the end faces 3.3, 3.4 when the cassette seal is new. The range spacers 12.1, 12.2, . . . ensure a simple assembly and an exact allocation of the inner ring 3 and the outer ring 5 in the axial direction during normal use of the cassette seal. The range spacers are shorn off during the first revolutions of the inner ring 3 and/or the outer ring 5, so that, afterwards, these two parts touch upon each other only in the vicinity of the sealing lip 6. The range spacers are situated on an axial boundary surface of the outer ring 5 and are set apart in the circumferential direction. Also, these range spacers can altogether concentrically surround the rotational axis 8 with the same clearance, or they can be slightly offset in the radial direction from the axis of rotation, through which the shearing-off action is simplified during normal use. Another advantage of the configuration of the range spacers is their varying radial distance from the axis of rotation at the specific axial boundary surfaces of the outer ring. As a result, the assembly of the cassette seal is further simplified and damage is prevented, in particular to the housing seal, because the outer ring 5 is reliably prevented from executing tilting motions.

Figure 2:
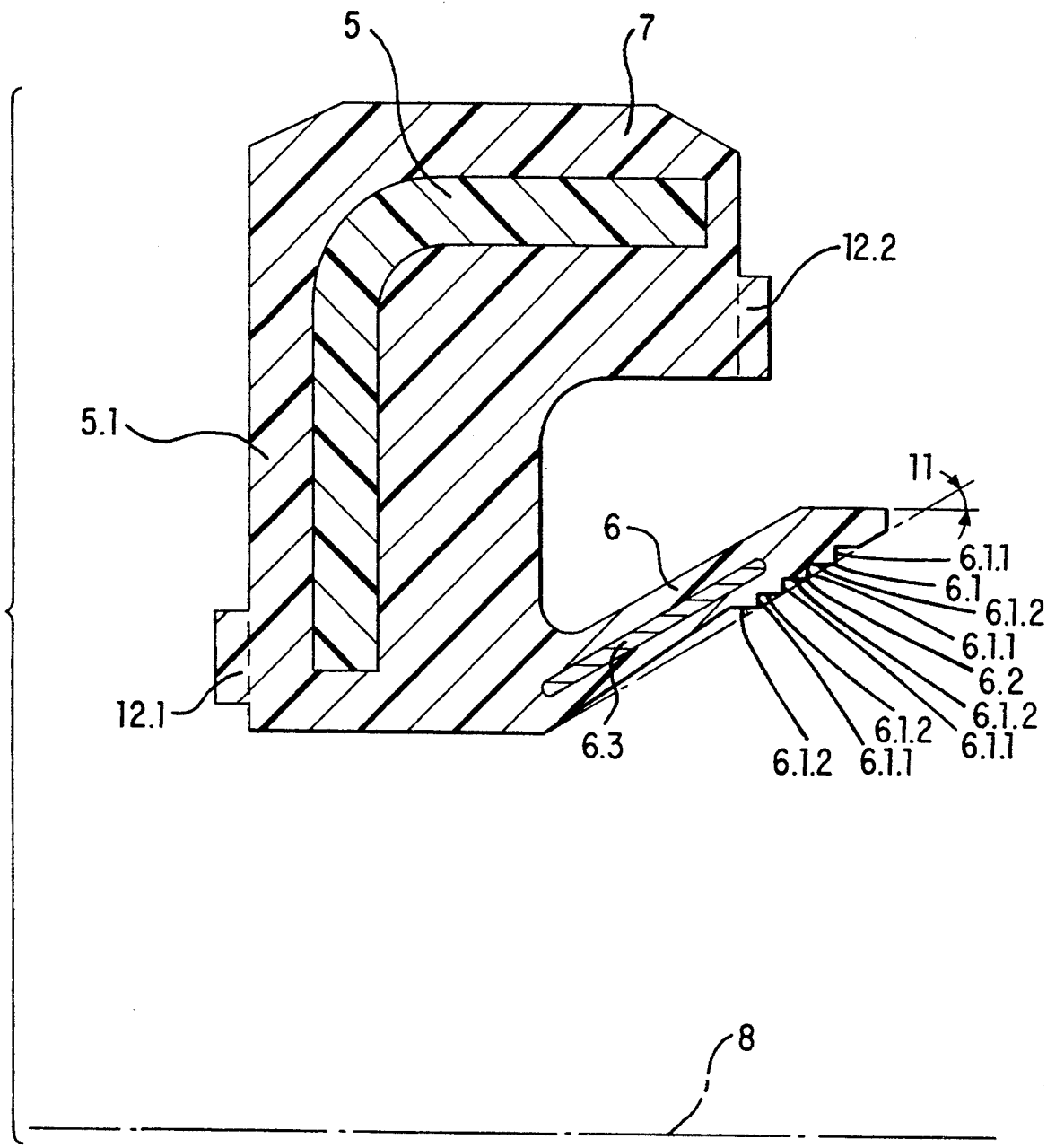
FIG. 2 shows the outer ring of the cassette seal of FIG. 1 is a component part.

Referring to FIG. 2, the outer ring 5 is shown as a component part. Because the sealing lip 6 widens in the radial direction to the outside, it forms an angle 11 with the axis of rotation 8, preferably amounting to 20° to 45° (in this example its 30°). The pressing of the sealing lip 6 against the end face 3.3 of the inner ring depicted in FIG. 3 can take place in dependence on the angle 11 and a flexible reinforcement element 6.3 arranged, as needed, only in the axial direction in at least one subsection of the extent.

Figure 3:
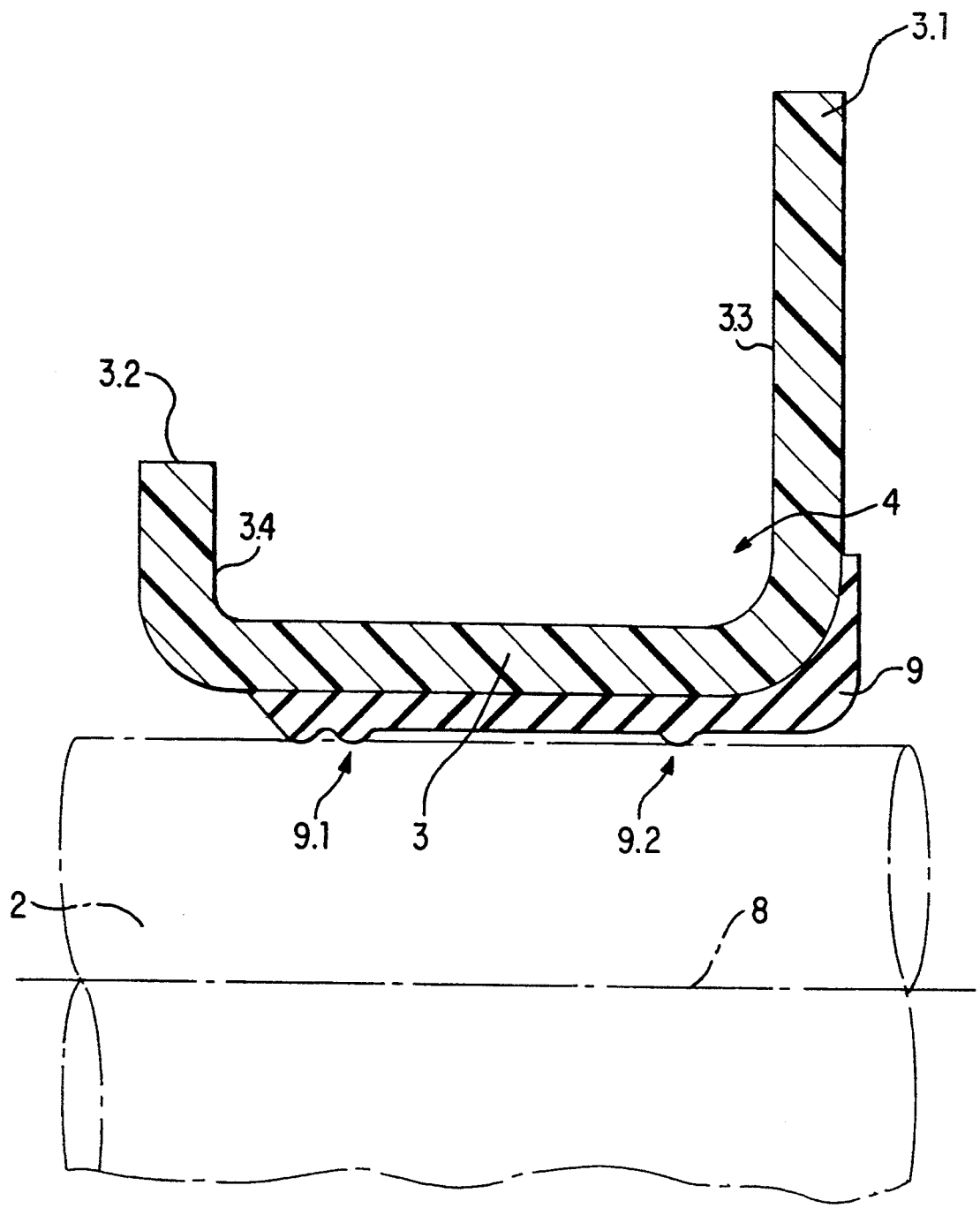
FIG. 3 depicts the inner ring of the cassette seal of FIG. 1, which is arranged during normal use of the cassette seal on a rotating shaft, relatively locked (to prevent turning) with respect to this shaft.

Referring to FIG. 3, the inner ring 3 from the mounted cassette seal according to FIG. 1 is shown. The seal 9 for sealing off the shaft 2 is secured to the inner ring 3 in a fluid-tight manner. The inner ring 3, which defines a groove 4 open in the radial direction to the outside, exhibits parallel end faces 3.3, 3.4 on the mutually facing surfaces of the ring projections 3.1, 3.2. The range spacers 12.1, 12.2 . . . of the outer ring are joined to these parallel end faces 3.3, 3.4 when the cassette seal is new.

Figure 4:
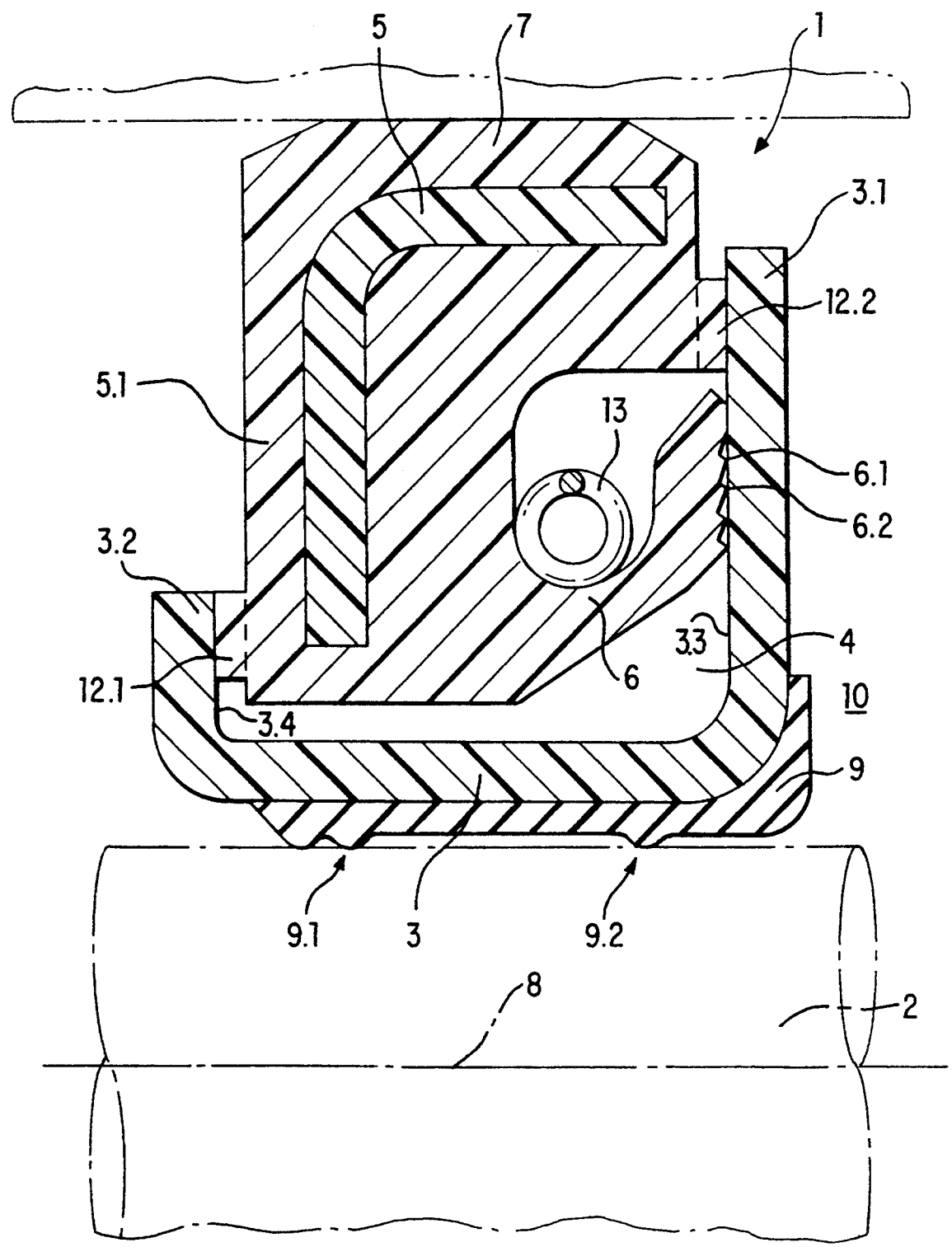
FIG. 4 shows an improved embodiment of the cassette seal of the present invention having an annular helical spring arranged in the vicinity of the sealing lip.

Referring to FIG. 4, another embodiment of the cassette seal of the present invention is shown which corresponds to the cassette seal of FIG. 1. An annular helical spring 13 is configured in the area of the sealing lip 6. The spring 13 reduces relaxation in the sealing lip 6, which can possibly occur over a long service life. This improvement enables the good working properties of the cassette seal to be retained, even during a long service life. Moreover, the capability of the cassette seal to be simply manufactured is not adversely affected by the arrangement of the annular helical spring 13.

What is claimed is:

1. A cassette seal for sealing off a gap appearing between a bore hole and a shaft, comprising:
   an inner ring secured to the shaft and having a groove opening radially in an outward direction, said inner ring being designed as one piece and having first and second ring projections at axial ends of the inner ring, said ring projections being formed from a plastic deformation of said inner ring and projecting in an outward direction;
   an outer ring secured in the bore hole having a flange-type radial projection engaging with the groove, said groove being defined in an axial direction by first and second end faces of said inner ring turned toward each other, said outer ring being limited in an axial direction on both sides by a plurality of range spacers being formed of a polymer material, said range spacers being set apart in a circumferential direction and abutting onto said first and second end faces of said inner ring when said cassette seal is new and unused;
   a sealing lip secured proximately to an inner circumference of said radial projection, said sealing lip being formed from a polymer material, said sealing lip sealingly contacting said inner ring on an area of said first end face; and
   at least said inner ring being formed from a plastically deformed sheet metal.

2. The cassette seal of claim 1, wherein said outer ring is surrounded by said range spacers, sealing lip, and housing seal as one piece, said outer ring, range spacers, sealing lip, and housing seal being formed as one piece from a polymer material.

3. The cassette seal of claim 2, wherein said plurality of range spacers comprises positioning nubs extending substantially equally in an axial direction.

4. The cassette seal according of claim 3, wherein said positioning nubs of a first axial side of said outer ring are allocated to an imaginary axis of rotation of said shaft at an equal radial distance, said positioning nubs on a second axial side of said outer ring facing a space to be sealed off exhibit a greater radial distance from said imaginary axis of rotation than do said positioning nubs on the first axial side of said outer ring turned away from the space to be sealed off.

5. The cassette seal of claim 4, wherein on said second axial side of said outer ring turned in the radial direction toward the shaft, the inner ring is coupled in a fluid-tight manner to a seal, in an axial direction said seal having at least two mutually adjacent sealing areas sealingly abutting on the shaft during normal use of the cassette seal.

6. The cassette seal of claim 5, wherein said sealing areas exhibit a curvilinier profile.

7. The cassette seal of claim 6, wherein said sealing lip is widened in a radial direction and forms and angle of 10° to 60° with said imaginary axis of rotation before being mounted in said inner ring.

8. The cassette seal of claim 7, wherein the angle between said sealing lip and said imaginary axis of rotation is between 20° to 45°.

9. The cassette seal of claim 8, wherein said sealing lip includes at least two sealing edges adjacent in a direction of the space to be sealed off, said sealing edges being formed by converging first and second boundary surfaces of sealing teeth adjoining one another, said first boundary surfaces being arranged one behind another in the direction of the space to be sealed off form an angle larger with the first end face of said inner ring than the angle between the second boundary surfaces the first end face of said inner ring.

10. The cassette seal of claim 9, wherein said sealing lip is limited in the direction of the space to be sealed off by an end section lying flat on said first end face of said inner ring.

11. The cassette seal of claim 10, wherein in at least one subsection of its extent, said sealing lip surrounds a reinforcement element that is flexible only in an axial direction.

12. The cassette seal of claim 11, further comprising: an annular helical spring configured proximately to said sealing lip.

* * * * *